Dec. 24, 1929.  B. S. FLORADAY  1,740,728
FLUID OPERATED BRAKE SYSTEM
Filed July 3, 1924  2 Sheets-Sheet 1
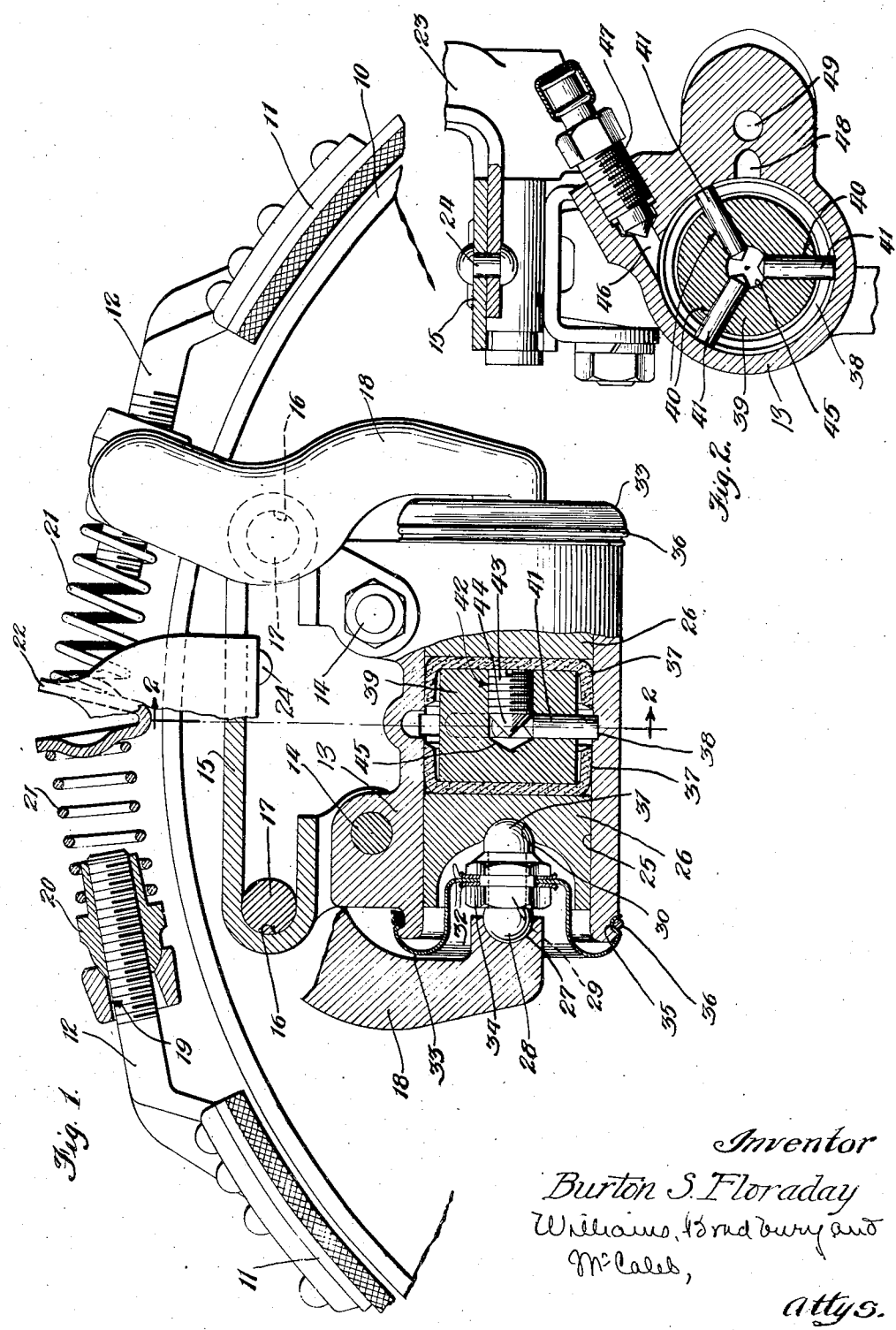
Inventor
Burton S. Floraday
Williams, Bradbury and
McCaleb,
attys.

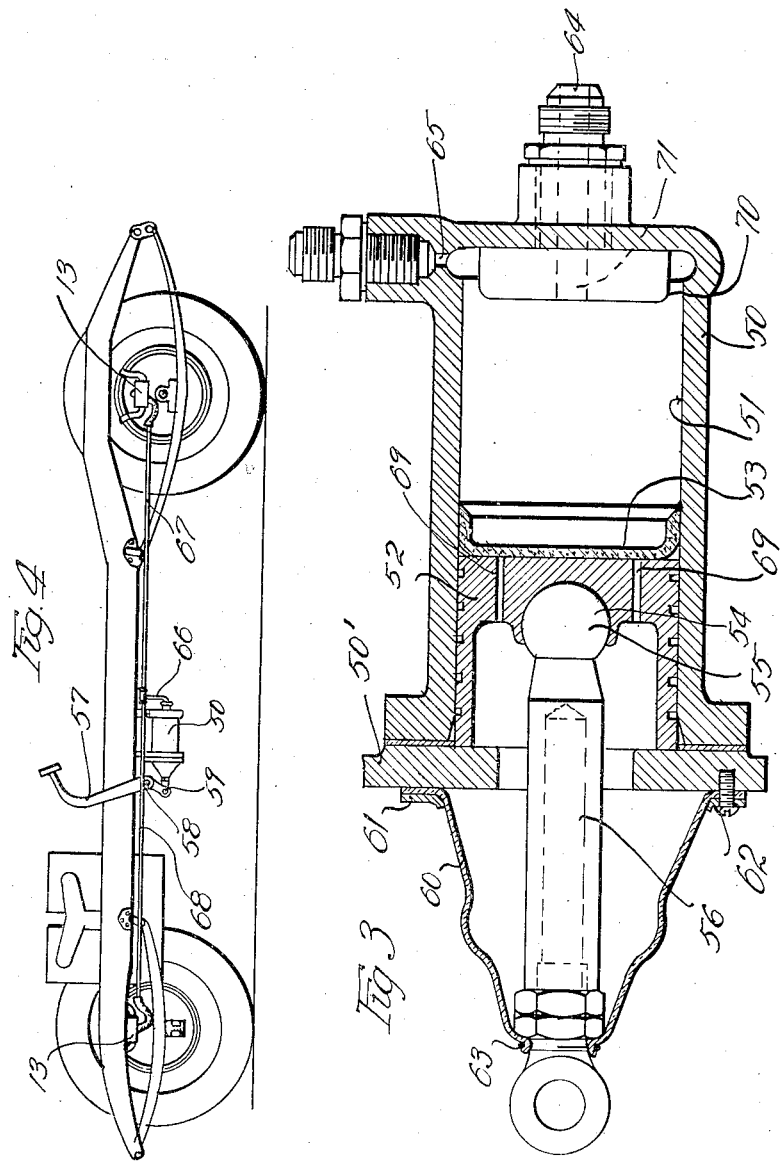

Patented Dec. 24, 1929

1,740,728

UNITED STATES PATENT OFFICE

BURTON S. FLORADAY, OF DETROIT, MICHIGAN, ASSIGNOR TO HYDRAULIC BRAKE COMPANY, OF LOS ANGELES, CALIFORNIA, A CORPORATION OF CALIFORNIA

FLUID-OPERATED BRAKE SYSTEM

Application filed July 3, 1924. Serial No. 723,888.

This invention relates to fluid operated brake systems for vehicles, such as are used in connection with automobiles. This application discloses features in common with my application for Letters Patent Serial No. 699,196, filed March 14, 1924, on piston and cylinder construction.

In a system such as the one herein disclosed, a brake operating cylinder is provided in association with each of the brake wheels. In addition, a main compressor cylinder is provided, the piston of which, in the present embodiment of the invention, is adapted to be operated by a foot-actuated lever. Tubes are provided which connect the main compressor cylinder to the cylinders which are individual to the respective brake wheels.

A system of this type requires for its best operation that the system shall contain only the actuating liquid and that all air shall be excluded.

As it has been found difficult to so treat leather piston cups that they will be impervious to the passage of the alcohol and oil solution used in the system when subjected to the high pressure used in applying the brakes, the use of piston cups of fairly hard vulcanized rubber or rubber composition was suggested. These rubber piston cups, however, have a tendency to cold flow and be extruded from under the clamping means by which the cup is attached to the piston head. As a result of this action it has been found that the piston cup would sometimes engage the cylinder very firmly at one side of the cup and very lightly at the other.

The object of the present invention is to provide a structure in which the piston cup is self centering and therefore engages the cylinder wall substantially equally throughout its circumference and which also prevents creating a vacuum in the system upon forcibly withdrawing a piston which would tend to suck air into the system.

It is believed the invention will be understood most readily from a detailed description thereof taken in connection with the accompanying drawings, in which Figure 1 is a view of a portion of the brake mechanism of an automobile wheel, showing the brake operating cylinder partly in section, associated therewith;

Figure 2 is a section substantially on the line 2—2 of Figure 1;

Figure 3 is a section through the main compressor cylinder, and

Figure 4 is a diagrammatic view showing an automobile chassis with applicant's brake system associated therewith.

Referring now to the drawings, in which like reference characters indicate the same parts in the several views, 10 indicates a portion of the brake drum about which is a brake band, the ends of which are shown at 11. Secured to each of the ends 11 of the brake band is a threaded lug 12. At 13 is shown the block for the brake operating cylinder. The cylinder block 13 may be rigidly secured to the dust guard or cover plate for the brake drum 10 in a manner well understood. Fixed to the cylinder block 13 by means of the bolts 14 is the yoke member 15, the opposite ends of which are rebent to form the bearings 16 within which are positioned the pivotal supporting members 17 which project laterally from the brake operating levers 18. The upper end of each of the brake operating levers 18 is provided with an opening 19 through which projects one of the threaded lugs 12. Nuts 20 are provided on the threaded lugs 12 to form an abutment for the upper ends of the levers 18. Springs 21 are provided, each of which has one of its ends in engagement with a nut 20, the opposite end being in engagement with a fixed abutment 22 carried at the upper end of an arm 23 secured to the yoke 15 by means of rivets 24.

The block 13 is provided with the central cylindrical opening 25 within which are positioned the oppositely displaceable pistons 26. The lower end of each of the levers 18 is provided with a substantially semi-spherical recess 27 adapted to receive the rounded end 28 of the piston rod 29.

It is to be understod that the mechanism associated with the two pistons are identical, and only one of the pistons and its associated parts will, therefore, be described in detail.

Positioned about the piston rod 29 is a pair of washers 32 between which is the edge of a dust-excluding apron 33, the washers being forced into firm engagement with the opposite sides of the edge of the apron 33 by means of the nuts 34 threaded onto the piston rod 29. The cylinder block 13 is provided adjacent to the end thereof with the circumferential groove 35, and the outer edge of the apron 33 is secured within the groove 35, by a tension device 36 of wire, cord, or other desired character. The apron 33 may be formed of rubber similar to the inner tube of an automobile tire or other suitable material.

Each of the pistons is provided with a packing member 37 formed of hard vulcanized rubber or rubber composition. The packing member 37 has the form of the ordinary cup leather, but, unlike the usual cup leather, is not secured in any way to the piston but is maintained in engagement therewith solely by the pressure of the liquid within the system.

By arranging the packing member so as to be unattached to the piston, the packing is maintained centrally of the piston under all conditions. It has been found that the packing member of the character herein disclosed being fairly rigid, though resilient, in structure, will remain in its proper operative relation to the piston even though it is not secured thereto, thus causing a more perfect and satisfactory operation of the device.

The cylinder block 13 is provided centrally of the cylinder 25 with a circumferential groove 38. Positioned centrally of the cylinder 25 is a block 39 of iron or other solid material. The block 39 has three radially extending equiangularly positioned apertures 40 within each of which is slidably positioned a pin 41. The block 39 is provided with the central longitudinally extending threaded aperture 42 within which is the screw threaded member 43 provided with a cone-shaped end 44. The inner ends of the pins 41 are tapered, as indicated at 45, and the cone-shaped end 44 of threaded member 43 is adapted to engage the tapered ends of the pins 41 and force the outer ends of said pins into the groove 38 within the cylinder wall, thus firmly anchoring the block 39 centrally of the cylinder. The opposite ends of the block 39 are arranged to project into the cup-shaped packing members 38 so that when the pistons 26 are in their normal positions the block acts as a limiting stop for the pistons.

At the top of the cylinder is a bleeder opening 46 through which any air in the system may be permitted to escape. The opening 46 is normally closed by means of the screw threaded valve member 47. Liquid under pressure is admitted centrally of the cylinder through the opening 48 which communicates through the aperture 49 with the tube, by means of which the liquid is conveyed to the cylinder. This detail of the structure forms no part of the present invention, as any desired means may be employed for conveying the liquid to the cylinder between the edges of the packing members when in normal positon.

Referring now to Figure 3, 50 indicates the block of the main compressor cylinder which is rigidly supported from the vehicle chassis in any desired manner. In the present embodiment, the open end of the cylinder is shown as abutting the frame member 50' to which it is secured through the medium of bolts, cap screws, or other desired means. The block 50 has the cylindrical bore 51 within which the piston 52 is slidably arranged. The piston 52 is provided with the packing member 53 which, except for size, may be substantially the same as the packing members 37 shown in connection with the brake operating cylinder. The piston 52 is formed with a substantially semi-spherical recess 54 arranged to receive the rounded end 55 of the piston rod 56.

The brake operating lever 57 is pivotally supported at 58 and the lower end is pivotally joined to the end of the piston rod 56, as indicated at 59. A tapered leather or rubber boot 60 is provided about the projecting end of the piston rod 56. The larger end of the boot 60 is turned outwardly and is clamped to the frame member 50' by means of the clamping ring 61, screws 62 being provided to hold ring 61 in clamping position. The smaller end of the boot 60 is secured to the piston rod 56 adjacent to the outer end thereof by means of the wire or cord 63. The outlet from the compressor cylinder is indicated at 64. At 65 is shown an opening through which the air within the system may escape or through which liquid may be added to the system when required.

Referring now to Figure 4, it will be noted that the outlet opening 64 of the compressor cylinder 50 is joined by means of tube 66 to the tubes 67 and 68 which extend, respectively, to the rear and forward brake operating cylinders on the opposite sides of the vehicle.

The operation of the system will now be described.

Assuming that the brake operating mechanism is in normal position, the pistons 26 will be forced into engagement with the blocks 39 by means of the expansion springs 21, and the compressor cylinder piston 52 will be forced to its retracted position by means of the liquid which has been expelled from the cylinders 25 by means of the springs 21. If now it is desired to actuate the brakes, the driver will force the upper end of the foot lever 57 forwardly, thus causing the lower end of said lever to move to the right, as viewed in Figure 4. This will cause the piston 52 of the compressor cylinder 51 to move to the right as viewed in Figures 3 and 4 and expel the liquid from the main compressor cylinder. The liquid expelled from the compressor cylinder 51 will travel through the tubes 66, 67 and 68 to the brake operating cylinders 25 of the several wheels, where it will enter between the adjacent edges of the packing members 37. The liquid entering the cylinders 25 will cause the pistons 26 to be moved in opposite directions, from each other, thus separating the lower ends of the levers 18, and forcing the upper ends of said levers toward each other, tightening the brake band about the brake drums 10.

When it is desired to release the brakes, pressure is removed from the foot lever 57. The tension in the compression spring 21 now acts to force the upper ends of the levers 18 from each other, and the lower ends of the levers toward each other, thus expelling the liquid from the brake operating cylinders and causing it to travel in a reverse direction through the tubes 67, 68 and 66 back into the main compressor cylinder 51. The liquid entering the cylinder 51 causes the piston 52 to be displaced to the left, as seen in Figures 3 and 4. The braking apparatus has now been returned to its normal inoperative position.

In systems of the type herein disclosed where the piston packing was in the nature of a cup leather fixed to the piston, it occasionally happened that an operator would operate the foot lever to forcibly withdraw the main compressor cylinder piston. This operation has a tendency to create a vacuum in the system, and cause air to pass by the flanges of the cup leather into the system, causing an undesirable condition to exist. Where the piston packings or cups are unattached to the pistons, as in the present disclosure, there is no possibility of forcibly retracting the packing members and thus it is impossible to create a partial vacuum within the system, with the consequent tendency of air passing by the packing members.

While in the drawings and in the above description applicant has described merely one embodiment of his invention, it is to be understood that various modifications in the details are contemplated and the invention, therefore, is to be limited merely by the scope of the appended claims.

In order to reduce any possibility of the piston 52 operating forcibly to withdraw the packing member 53, the piston may be provided with a plurality of relief apertures 69.

Having thus described my invention, what I claim as new and desire to secure by Letters Patent of the United States is:

1. In apparatus of the class described, a fluid operated brake system for vehicles, comprising in combination a fluid cylinder, a piston slidable in said cylinder and subject to longitudinal vibration resulting from movement of said vehicle, and a packing member for said piston adjacent the end of said piston, said packing member unattached to said piston to permit vibration of said piston without corresponding vibration of said packing member.

2. In piston and cylinder construction, a cylinder, a piston operatively disposed therein, a free packing cup associated with the end of the piston to serve as packing therefor capable of seating movement in the cylinder independently of the piston and means within the cylinder for causing the cup to seat upon the piston when the piston recedes.

In witness whereof, I hereunto subscribe my name this 28th day of June, 1924.

BURTON S. FLORADAY.